(12) United States Patent
Classon et al.

(10) Patent No.: US 6,700,867 B2
(45) Date of Patent: Mar. 2, 2004

(54) METHOD AND SYSTEM FOR REDUCED MEMORY HYBRID AUTOMATIC REPEAT REQUEST

(75) Inventors: Brian Keith Classon, Palatine, IL (US); Vipul Anil Desai, Palatine, IL (US); Mark Cudak, Mc Henry, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/027,419

(22) Filed: Dec. 20, 2001

(65) Prior Publication Data

US 2003/0118031 A1 Jun. 26, 2003

(51) Int. Cl.[7] .................................................. H04L 1/16
(52) U.S. Cl. ......................... 370/216; 370/317; 714/748
(58) Field of Search .............................. 370/216, 225, 370/242, 252, 310, 317, 328; 714/746, 748, 749, 750, 751, 774

(56) References Cited

U.S. PATENT DOCUMENTS

| | | | |
|---|---|---|---|
| 5,229,767 A | | 7/1993 | Winter et al. |
| 5,657,325 A | * | 8/1997 | Lou et al. ..................... 370/334 |
| 5,954,839 A | * | 9/1999 | Park et al. ................... 714/699 |
| 5,983,382 A | * | 11/1999 | Pauls ........................... 714/744 |
| 6,138,260 A | * | 10/2000 | Ketseoglou ................. 714/751 |
| 6,308,294 B1 | * | 10/2001 | Ghosh et al. ................ 714/751 |
| 6,314,541 B1 | * | 11/2001 | Seytter et al. ............... 714/748 |

OTHER PUBLICATIONS

Robert Love, Amitava Ghosh, Robert Nikides, Louay Jalloul, Mark Cudak, & Brian Classon, "High Speed Downlink Packet Access Performance," Proc. IEEE VTC–2001/Spring, 2001, pp. 2234–2238.

Sophia Antipolis, "AMC and HARQ for HSDPA," 3GPP TSG RAN WG1 & WG2 meeting on HSDPA, Apr. 5–6, 2001, 21 pp., Lucent Technologies.

Amitava Ghosh, Louay Jalloul, Mark Cudak, & Brian Classon, "Performance of Coded Higher Order Modulation and Hybrid ARQ for Next Generation Cellular CDMA Systems," Proc. IEEE VTC–2000/Fall, Sep. 2000, pp. 500–505, Boston, MA.

Yu–Cheun Jou, "An Update on cdma2000 1xEV Phase 1 (HDR)," 3GPP2 c30–20000627–xxx, Jun. 27, 2000, 10 pp., Qualcomm Incorporated.

"Two–Burst Based Link Quality Control Proposal for EGRPS," ETSI SMG2 WPA/WPB meeting TDoc SMG2 WPA 127/99 WPB 003/99, Jan. 1999, pp. 1–9, Source: AT&T, Ericsson, Lucent, Nokia, and Nortel.

"Digital cellular telecommunications system (Phase 2+); Radio transmission and reception," Draft ETSI EN 300 910, Release 1999, pp. 39–40, Version 8.5.0 (2000–07), Global System for Mobile Communications.

"Digital cellular telecommunications system (Phase 2+); General Packet Radio Service (GRPS); Mobile Station (MS)—Base Station System (BSS) interface; Radio Link Control/Medium Access Control (RLC/MAC)," Draft ETSI EN 301 349, Release 1999, pp. 123–124, 195–196, Version 8.4.0 (2000–05), Global System for Mobile Communications.

Shu Lin and Daniel J. Costello, Jr., "Error Control Coding: Fundamentals and Applications," 1983, pp. 477–494, Prentice Hall, Inc., Englewood Cliffs, New Jersey.

* cited by examiner

*Primary Examiner*—Min Jung
(74) *Attorney, Agent, or Firm*—Kenneth A. Haas

(57) ABSTRACT

The invention provides a method for operating a hybrid automatic repeat request communication system wherein it is determined whether a receiver can process a data packet, and a self-decode request associated with the data packet is sent based on the determination.

33 Claims, 5 Drawing Sheets

METHOD AND SYSTEM FOR REDUCED MEMORY HYBRID AUTOMATIC REPEAT REQUEST

FIELD OF THE INVENTION

This invention generally relates to the transmission of data packets over digital communication systems. In particular, the invention relates to a method and apparatus for operating a communication system using a reduced memory hybrid automatic repeat request.

BACKGROUND OF THE INVENTION

Transmission of data packets over wired and wireless links needs to be fast and reliable. Speed requirements are set by seemingly ever-increasing data transfer rates, and quality of service requirements are set by increasing system needs for accuracy in transmissions.

Digital data transmissions over wired and wireless links sometimes may be corrupted, for instance, by noise in the link or channel, by interference from other transmissions (e.g., radio), or by environmental factors related to, for example, the speed, direction, location and requests between transmitting and receiving units. Even with clear communication channels (i.e., channels with limited corruption), which lend themselves to the high data rates, it may not be possible to appropriately decode the data stream with the requisite error rates. Digital data transmissions may also be limited by an inability of the receiving or transmitting equipment to appropriately encode and decode the data stream at the speeds desired with the requisite error rates.

In other situations, it may be infeasible to provide hardware suitable for high rate data transmission at a cost and portability demanded by the application. Requested services may range from voice communications over high-speed Internet connections to video conferencing. The hardware at the receiver end should be light and small, and use minimal amounts of power. Similarly, digital signal processing hardware for accurate conveyance of data packets should be compact and consume low power. Portability restrictions may require that all system attributes be well designed, using a minimal amount of integrated circuits, electronic components, batteries, and other components.

Error detection and correction codes typically provide mechanisms necessary to reliably receive and decode data packets. Forward error correction (FEC) codes allow decoders to accurately reconstruct data packets received with possible errors at the expense of some additional overhead (e.g., extra parity bits, extra symbols). Forward error protection may protect a data packet. With FEC, the protected data packet is generally "self-decoding" in that all the data (information) required to reconstruct the data packet is within a single receive block. Stored data may rely on FEC for reliable extraction. In two-way systems, an opportunity for requesting that a data packet be retransmitted upon detection of an error may be available. An automatic repeat request (ARQ) may be sent upon detection of an error using, for example, a parity bit check or a cyclic redundancy check (CRC), and then the original data packet may be discarded. Upon receipt of an ARQ request, the packet may simply be retransmitted in its original form.

While this simple combination of ARQ and FEC is sometimes called Type I hybrid ARQ, the term "hybrid ARQ" is usually reserved for a more complex procedure where a receiver may combine previously received erroneous packets with a newly received packet in an effort to successfully ascertain the contents of the packet. The general procedure in a hybrid automatic repeat request (HARQ) system is that a receiver may generate an indicator, such as an ARQ request, upon detection of an error in the received data packet. Unlike Type I ARQ, the receiver does not discard previously received erroneous packets. The receiver may keep (e.g., store) the entire or portions of the erroneous packet because the erroneous packet may still contain worthwhile information, and therefore is not discarded when using HARQ. By combining erroneous packets, the receiver may be able to assist the FEC to correct the errors. The receiver may require, however, an abundance of volatile memory for storing previous data packets and provisioning for the needs of the HARQ decoder. A HARQ buffer may contain a large amount of memory designated for just this purpose. Large memory requirements, particularly in portable, mobile equipment, may require excessively large space and consume an excessively large amount of power. A method for decreasing the amount of memory required for a HARQ system is therefore desirable. Methods for managing and optimizing volatile memory available in a communication system are also desirable. The method should be compatible with any ARQ protocol, such as selective-repeat or multi-channel stop-and-wait, and capable of being used with all underlying types of HARQ.

As demands for higher data rates increase, techniques for inserting more data into a single channel or into multiple channels become more attractive. Adaptive modulation and control (AMC) techniques adjust the modulation scheme used for the transmission of a data packet. A clear channel, for example, may use a high order of modulation to transmit data at a higher rate. A noisy (or possibly faded, and/or interference-limited) channel may require the use of a lower order of modulation and a consequently lower data rate. When the channel clears up, a high order of modulation technique may be used again. Multiple input, multiple output (MIMO) transmission techniques utilizing multiple antennas for transmitting and receiving radio-frequency signals enhance the data rates that are possible using multiple channels. Effective HARQ architectures are needed to extract the full advantages of AMC and MIMO for higher data rates, while retaining compatibility with ARQ and HARQ systems.

It is the object of this invention, therefore, to provide a method for the rapid and reliable transmission of data packets over wired links and wireless links, and overcome the deficiencies and obstacles described above.

SUMMARY OF THE INVENTION

One aspect of the invention provides a method of operating a hybrid automatic repeat request communication system in a receiver. A determination may be made on whether the receiver can process a data packet, and a self-decode request associated with the data packet may be sent based on the determination. The determination may be based on the availability of a hybrid automatic repeat request memory buffer. The determination may be based on a decoder metric generated from decoding the data packet. The decoder metric may be compared to a predetermined decoding threshold. The determination may be based on a channel quality attribute. The self-decode request may comprise a request for a self-decodable data packet. The self-decode request may comprise a request for a non-self-decodable data packet. The self-decode request may comprise a self-decode request field of at least one bit. The method may include allocating a portion of a hybrid automatic repeat request memory buffer pool to a reserved buffer. The method may also include storing the data packet in the reserved buffer prior to decoding.

Another aspect of the current invention is a hybrid automatic repeat request communication system comprising a means for determining whether a receiver can process a data packet, and a means for sending a self-decode request associated with the data packet based on the determination. The system may comprise a means for allocating a portion of a hybrid automatic repeat request memory buffer pool to a reserved buffer. The system may also comprise a means for storing the data packet in the reserved buffer prior to decoding.

Another aspect of the current invention is a computer usable medium including a program for operating a hybrid automatic repeat request communication system that contains computer program code for determining whether a receiver can process a data packet, and computer program code for sending a self-decode request associated with the data packet based on the determination. The computer program code may allocate a portion of a hybrid automatic repeat request memory buffer pool to a reserved buffer. The computer program code may store the data packet in the reserved buffer prior to decoding.

Another aspect of the current invention is a method of operating a hybrid automatic repeat request communication system. A determination may be made on whether a self-decode request has been received at a transmitter, and a self-decodable data packet may be generated at the transmitter based on the self-decode request determination. The self-decode request may be received from a hybrid automatic repeat request communication device in response to a memory availability determination. The self-decode request may be received from a hybrid automatic repeat request communication device in response to a channel decoder status. The method may comprise a determination on whether a negative-acknowledgement signal has been received at the transmitter in response to a transmitted data packet, and a generation of the self-decodable data packet based on the negative-acknowledgement signal determination. The method may comprise a determination on whether one of an acknowledgement signal or a negative-acknowledgement signal in response to a transmitted data packet has been received within a predetermined period of time at the transmitter, and the self-decodable data packet may be generated if it is determined that the acknowledgement signal or negative-acknowledgement signal has not been received.

Another aspect of the current invention is a hybrid automatic repeat request communication system comprising a means for determining whether a self-decode request has been received at a transmitter, and a means for generating a self-decodable data packet at the transmitter based on the self-decode request determination. The system may also comprise a means for determining whether a negative-acknowledgement signal has been received at the transmitter in response to a transmitted data packet, and a means for generating the self-decodable data packet based on the negative-acknowledgement signal determination. The system may include a means for determining whether one of an acknowledgement signal or a negative-acknowledgement signal in response to a transmitted data packet has been received within a predetermined period of time at the transmitter, and a means for generating the self-decodable data packet if it is determined that the acknowledgement signal or negative-acknowledgement signal has not been received.

Another aspect of the current invention is a computer usable medium including a program for operating a hybrid automatic repeat request communication system that contains computer program code for determining whether a self-decode request has been received at a transmitter, and computer program code for generating a self-decodable data packet based on the self-decode request determination. The computer program code may determine whether a negative-acknowledgement signal has been received at the transmitter in response to a transmitted data packet, and may generate the self-decodable data packet based on the negative-acknowledgement signal determination. The computer program code may determine whether one of an acknowledgement signal or a negative-acknowledgement signal in response to a transmitted data packet has been received within a predetermined period of time at the transmitter, and may generate the self-decodable data packet if it is determined that the acknowledgement signal or negative-acknowledgement signal has not been received.

Another aspect of the current invention is a hybrid automatic repeat request communication device in a receiver comprising a hybrid automatic repeat request buffer control unit, a pool of memory connected to the hybrid automatic repeat request buffer control unit to manage the pool of memory, a combine and store unit connected to the hybrid automatic repeat request buffer control unit to generate a channel decoder input based on a data packet, and a channel decoder connected to the combine and store unit to process the channel decoder input, where the data packet may be stored in the pool of memory in response to a hybrid automatic repeat request buffer memory determination. The hybrid automatic repeat request buffer control unit may partition the pool of memory into a reserved buffer and at least one hybrid automatic repeat request memory buffer. The partitioning of the pool of memory may be based on a statistical method to store the data packet. A self-decode request generator may be connected to the hybrid automatic repeat request buffer control unit and may be connected to the channel decoder. The self-decode request generator may send a self-decode request in response to the hybrid automatic repeat request buffer memory determination. The self-decode request generator may send a self-decode request in response to a channel decoder status.

Another aspect of the current invention is a hybrid automatic repeat request communication device in a transmitter comprising a self-decode request latch to provide an encoding scheme selection input in response to a self-decode request, an encoder control unit connected to the self-decode request latch to select an encoding scheme associated with an input data packet based on the encoding scheme selection input, and a channel encoder connected to the encoder control unit to encode the input data packet, where the input data packet may be encoded as a self-decodable data packet by the channel encoder in response to the self-decode request.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
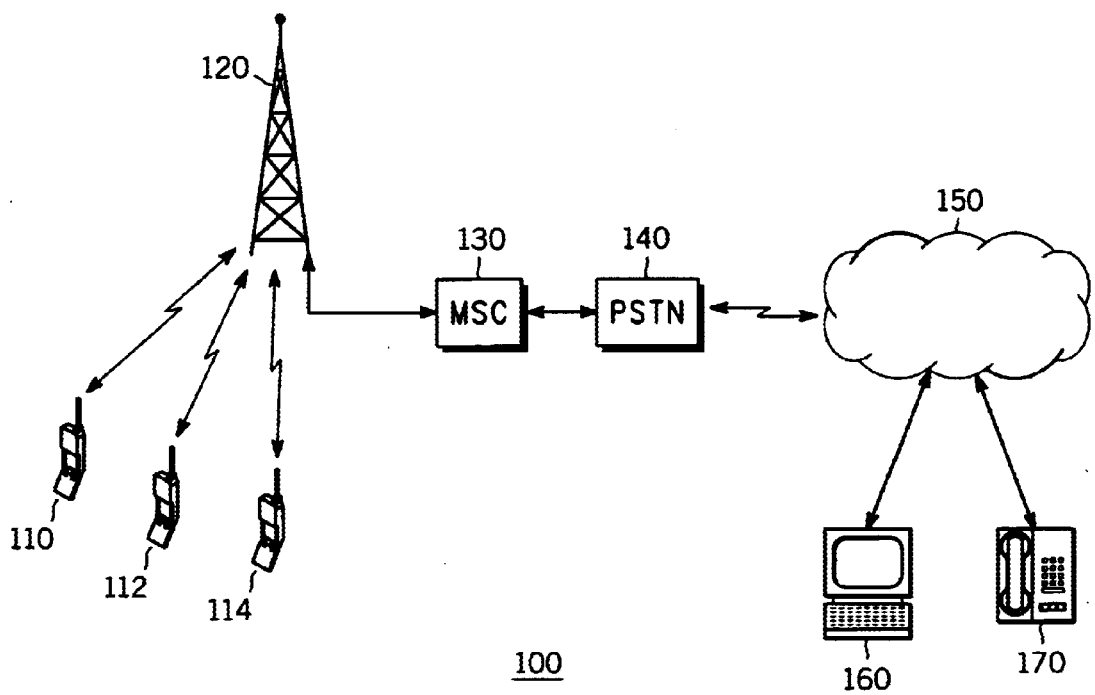
FIG. 1 is a schematic diagram of one embodiment of a system for reduced memory hybrid ARQ, in accordance with the current invention.

FIG. 1 shows a schematic diagram of one embodiment of a system for reduced memory hybrid ARQ, in accordance with the present invention at 100.

Reduced memory HARQ system 100 may include one or more wireless communication devices 110, 112, 114; one or more base stations 120; one or more mobile switching centers (MSC) 130; one or more public switched telephone networks (PSTN) 140; one or more communication networks 150; one or more data devices 160; and one or more voice devices 170.

The description of the reduced memory HARQ system 100 is not limited to wireless communication devices. In one embodiment, the reduced memory HARQ system 100 may be used for wireline communication devices that can include, for example, PSTN 140, or a digital subscriber line (DSL) service. For generality, a link may be a combination of a wireless and a wired connection between a transmitter and a receiver. A wired connection may comprise one or more switched lines over one or a combination of wires and fibers. A wireless connection may comprise operating at radio frequencies.

Wireless communication devices 110, 112, 114 may be cellular phones operating in a prescribed band of frequencies nominally at 800 MHz. Wireless communication devices 110, 112, 114 may also be cellular phones operating in a prescribed band of frequencies nominally at 900 MHz, 1900 MHz, or any suitable band of frequencies prescribed for wireless communication. Wireless communication devices 110, 112, 114 may be mobile phones carried by a human user, installed on mobile equipment, or used in any application where wireless communication services are desired. Wireless communication devices 110, 112, 114 may contain suitable hardware and software for receiving and transmitting digital transmissions. Wireless communication devices 110, 112, 114 may contain suitable hardware and software for reliably transferring data packets between the transmitter and the receiver. Wireless communication devices 110, 112, 114 may communicate with one or more base stations 120.

Base station 120 may contain suitable electronic equipment for transmitting and receiving radio frequency signals. Base station 120 may transmit and receive radio signals from wireless communication devices 110, 112, 114. Base station 120 may transmit and receive digitally encoded signals with wireless communication devices 110, 112, 114. Base station 120 may communicate directly with wireless communication devices 110, 112, 114. Communications between base station 120 and wireless communication devices 110, 112, 114 may include the transmission of data packets. Data packets sent to and from wireless communication devices 110, 112, 114 may be digitally encoded.

The data packets may be digitally encoded using a self-decodable or a non-self-decodable scheme (codes). The term scheme and code may be used interchangeably as appreciated by those skilled in the art. For a given data packet, there may be many non-self-decodable and self-decodable schemes. These schemes may be used in a variety of combinations. In one example, a channel decoder within a receiver may successfully decode a received data packet that has been encoded with a self-decodable code using only the contents of the received data packet. In a different example, a channel decoder may, in general, not be able to successfully decode a received data packet that has been encoded with a non-self-decodable code using the contents of the received data packet alone. In another example, a receiver may be able to combine two or more received data packets that were encoded with non-self-decodable schemes prior to successfully decoding the data packet. In yet another example, a receiver may be able to combine one or more received data packets that were encoded with non-self-decodable schemes and one or more received data packets that were encoded with self-decodable schemes prior to successfully decoding the data packet. In still another example, a receiver may be able to combine two or more received data packets that were encoded with self-decodable schemes prior to successfully decoding the data packet.

The transmission of data packets may use one or more modulation schemes, such as 16-QAM (quadrature amplitude modulation) or 8-PSK (phase shift keying). The modulation schemes and encoding schemes may be adaptively chosen based on factors such as requisite error rates or channel quality attributes.

A successful transmission of data packets may involve at least one additional transmission attempt (retransmission) of specific data packets whose contents were unsuccessfully decoded at the receiver. The retransmission may comprise a repeated transmission of the data packet that was corrupted by the channel. The retransmission may also comprise a different encoding of the data packet that is self-decodable. The retransmission may also comprise a different encoding of the data packet that is non-self-decodable. Any transmission smaller than the number of information bits/symbols in the data packet is necessarily non-self-decodable. The retransmission may be sent at a lower data rate to improve the reliability of the data. The retransmission may also be sent at the same data rate, such as a repeated transmission. In another example, the retransmission may be sent at a higher data rate. The data rate selection may be determined with feedback from the receiver in one example. In another example, the transmitter may select the data rate. The data rate selection may be related to the encoding scheme for a data packet.

Base station 120 may be connected to mobile switching center 130. Mobile switching center 130 may receive signals from wireless communication devices 110, 112, 114 through base station 120. Mobile switching center 130 may transmit signals to wireless communication devices 110, 112, 114 through base station 120. Mobile switching center 130 may contain suitable hardware and software for ensuring that transmissions between wireless communication devices 110, 112, 114 and base station 120 are accurate and reliable. Accurate and reliable transmission of data packets may require that certain data packets be retransmitted, or encoded in a manner such that the data packet may be decoded at the receiver without requiring an additional transmission of the data packet. Mobile switching center 130 may communicate with public switched telephone network 140.

Those skilled in the art understand that the suitable software and hardware for ensuring that transmissions between wireless communication devices 110, 112, 114 and base station 120 are accurate and reliable may be incorporated directly into the base station 120 instead of the mobile switching center 130. In this alternate embodiment, the system in FIG. 1 may be constructed without a single mobile switching center 130. In the absence of a mobile switching center 130, the base station would server as the terminus for wireless data packets exchanges. Alternatively, the hardware/software providing reliability may be also being incorporated into a third entity such as a packet data support node. In this second alternative embodiment, neither the base station nor the mobile switching center would contain reliability hardware/software. The packet data support node may be inserted between base station 120 and mobile switching center 130. Alternatively, the packet data support node may be inserted between mobile switching center 130 and public switched telephone network 140. Yet another alternative would be to use the packet data support node to connect base station 120 directly to communication network 150. In this latter configuration, the packet data support node would serve as terminus for wireless data packets instead of mobile switching center 130.

Public switched telephone network 140 may be a land-based telephone network. Public switched telephone network 140 may comprise one or more switched lines over one or a combination of wire, fiber, or wireless links. Public switched telephone network 140 may be connected to one or more communication networks 150.

Communication network 150 may be a private or a public network. Communication network 150 may comprise one or more electronic, optical or wireless communication paths, with associated hardware and software to connect public switched telephone network 140 with one or more data devices 160 and voice devices 170.

Those skilled in the art understand that mobile switching center 130 may be connected directly to a communication network without requiring the public switched telephone network 140 as an intermediary. Furthermore, when hardware/software for ensuring reliability is incorporated into base station 120, base station 120 may then be connected directly to communication network 150.

Data device 160 may be a networked computer. Data device 160 may also be a client, server, modem, or any system capable of receiving and transmitting data with communication network 150. Voice device 170 may be a land-based phone. Voice device 170 may be a cellular or mobile phone, or any device capable of receiving and transmitting voice signals with communication network 150. Voice device 170 may be capable of sending and receiving data transmissions in addition to voice transmissions. Reduced memory HARQ system 100 may utilize a method for operating a communication system using a reduced memory HARQ design for reliable data transmissions.

Reduced memory HARQ system 100 may alternatively be comprised of one or more wireless communication devices 110, 112, 114, base station 120, and mobile switching center 130. Wireless communication devices 110, 112, 114 and mobile switching center 130 may contain suitable hardware and software for transmitting and retransmitting data packets that may be encoded as self-decodable data packets or as non-self-decodable data packets. Data packets exchanged between wireless communication devices 110, 112, 114 and mobile switching center 130 may utilize a method for operating a communication system using a reduced memory HARQ design.

In a system capable of HARQ, the unit sending a data packet (i.e., the transmitter) may be able to receive messages from the unit designated to accept the data packet (i.e., receiver). The receiver may be capable of transmitting messages. The roles of the transmitter and receiver in a HARQ system are clear as appreciated by those skilled in the art. In a hybrid automatic repeat request system, a receiver may communicate to a transmitter several status indicators (messages) regarding a data packet, such as, (1) the receiver received the data packet and was able to successfully decode that data packet, (2) the receiver received the data packet but was unable to successfully decode that data packet, and (3) the receiver was unable to receive the data packet and thus was unable to successfully decode that data packet. The steps of receiving the data packet and attempting to decode may involve combining previous transmissions of the data packet. The steps may involve storing the data packet. There may be another scenario with regard to the data packet. For example, a receiver may be informed, for example, with a control channel, that a packet is to be sent by a transmitter. Due to situations such as a noisy channel or receiver not listening, the receiver may be unaware that the packet is to be sent. In this example, the receiver may not provide an indicator about the data packet because the receiver was not able to receive the data packet.

A hybrid automatic repeat request system may be an acknowledgement (ACK)-based system where the receiver sends an ACK to the transmitter upon a successful decode of a data packet. A HARQ system may be an ACK/NACK-based system; the transmitter may expect either an ACK or a negative acknowledgement (NACK) from a receiver that is associated with a data packet. Another HARQ system may be a NACK-based system. The operations of these systems are appreciated by those skilled in the art. One embodiment of the invention addresses the various methods of acknowledging a data packet.

The invention may be applied to many types of hybrid ARQ systems. Some examples of the types of hybrid ARQ systems include a system where retransmissions are self-decodable packets, a system where retransmissions are non-self-decodable, and a system where combinations of self-decodable and non-self-decodable packets are used. In each example of the system, the buffer management system in the receiver provides advantageous benefits to the receiver, such as smaller memory needed, or the ability to process different data packets. The benefits to the system may include high user throughput, and better system performance. In the example of the system where combinations of self-decodable and non-self-decodable packets are used, the receiver may allow the system to achieve higher throughput by requesting retransmissions that are sufficient to allow successful decoding.

Figure 2:
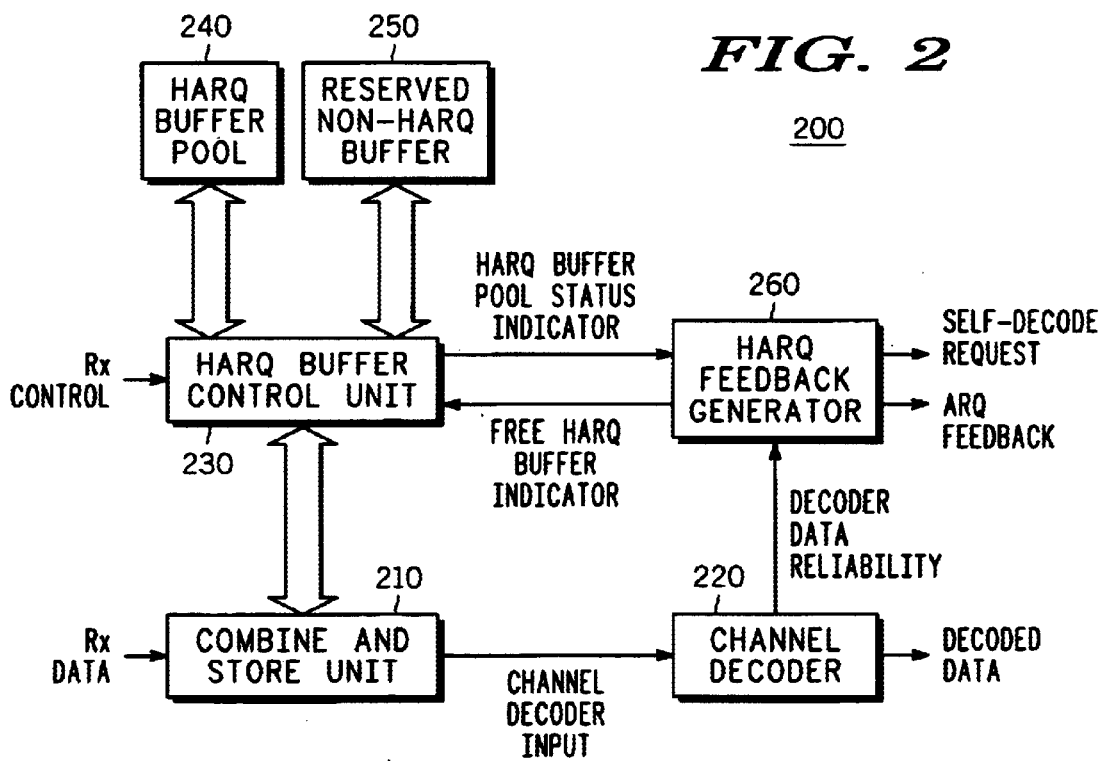
FIG. 2 is a block diagram of another embodiment of a system for reduced memory hybrid ARQ, in accordance with the current invention.

FIG. 2 shows a block diagram of one embodiment of a system for reduced memory hybrid ARQ, in accordance with the present invention at 200.

Reduced memory HARQ system 200 may contain a combine and store unit 210, a channel decoder 220, a HARQ buffer control unit 230, a HARQ buffer pool 240, a reserved non-HARQ buffer 250 and a HARQ feedback generator 260. Reduced memory HARQ system 200 may be located near the receiver of a communication device. The combination of the HARQ buffer pool 240 and the reserved non-HARQ buffer 250 may be called a pool of memory or a hybrid automatic repeat request memory buffer pool. The reserve non-HARQ buffer 250 may also be called a reserved buffer.

Combine and store unit 210 may be an electronic circuit capable of receiving a transmitted data packet, storing the data packet, producing a channel decoder input that comprises the data packet, and sending the channel decoder input to channel decoder 220. The combine and store unit 210 may produce the channel decoder input based on a number of received data packets. For example, with the first received data packet, combine and store unit 210 may transform the received data packet to produce the channel decoder input. In another example, with the ith received data packet with i>1, combine and store unit 210 may combine at least one of previous i-1 received data packets, which may be stored in HARQ buffer pool 240, to produce the channel decoder input. In another example, with the ith received data packet with i>1, combine and store unit 210 may disregard one or more of previous i-1 received data packets. In general, there may be at least one stored previous data packet associated with a received data packet. One example of combining may be Chase combining or incremental redundancy combining. If combine and store unit 210 determines to combine the received data packet and one or more stored data packets, the received data packet may be labeled a HARQ packet. There may be a method for combining in combine and store unit 210. The combining method may be, for example, a maximum ratio combining method, or an adding log likelihood ratios combining method. For example, with Chase combining the combine and store unit 210 may use maximum ratio combining. The combining method may be related to the decoding algorithm in channel decoder 220. The combining method may use a channel quality attribute associated with the data packet. For example, channel quality attributes may include a received power level (e.g., received signal strength indicator), an estimate of the carrier-to-interference ratio, an estimate of the signal-to-noise ratio, an eye opening in the received waveform, or a correlation value. These attributes may be measured by the receiver and may be contained in the receive (Rx) control signal.

HARQ buffer control unit 230 may provide previously received (and stored) data packets to combine and store unit 210 when combine and store unit 210 is required to combine. In one example, HARQ buffer control unit 230 may provide pointers to locations within HARQ buffer pool 240. HARQ buffer control unit 230 may manage the pool of memory for combine and store unit 210. HARQ buffer control unit 230 may provide a reserved buffer 250 for storing a data packet.

Received data packets may be transferred from combine and store unit 210 to a pool of memory under the control of HARQ buffer control unit 230. The combine and store unit 210 may modify the values of the received data packets before storing the values to the pool of memory. In one example, combine and store unit 210 may change the precision of the values of the received data packets. If the values comprise m bits, combine and store unit 210 may change the values to n bits, where $m \geq n$. In another example, the received data packet may be transformed before storage, such as converted to likelihood ratios.

When combine and store unit 210 combines the received data packet with the stored data packets, the resulting channel decoder input may inherit properties (e.g., be the union of properties) of the received data packet and stored data packets. For example, if the received data packet is self-decodable and the stored data packets are non-self-decodable, the channel decoder input may then be self-decodable. If the received data packet is self-decodable and the stored data packets are self-decodable, the channel decoder input may then be self-decodable. If the received data packet is non-self-decodable and the stored data packets are self-decodable, the channel decoder input may then be self-decodable. If the received data packet and the stored data packets are both non-self-decodable, the channel decoder input may not be self-decodable.

Channel decoder 220 may receive channel decoder inputs from combine and store unit 210. Channel decoder 220 may decode the channel decoder input, and send on the decoded data for further processing. Channel decoder 220 may decode the data packet (i.e., channel decoder input) using a self-decode algorithm if the channel decoder input represents a self-decodable data packet. Channel decoder 220 may decode the channel decoder input using other decoding schemes. After decoding the channel decoder input, channel decoder 220 may output the decoded data, and generate a channel decoder status depending on whether the decoding was successful. If decoding of the data packet is unsuccessful, a data reliability signal may be sent to a self-decode request generator or HARQ feedback generator 260 indicating the unsuccessful decoding attempt. The data reliability signal may be contained in a channel decoder status. The channel decoder status may be used by HARQ feedback generator 260 to provide normal ARQ feedback. If the data packet is self-decodable, the channel decoder may decode the received data packet with possible success. On retransmissions of data packets, if the current received data packet is self-decodable, the current received data packet may be decoded separately and then jointly (combined with one or more previously received data packets) decoded if the separate decoding fails.

Channel decoder 220 may generate a channel decoder status based on decoding the channel decoder input. In one example, if the data packet is encoded with a cyclic redundancy check (CRC) code, the channel decoder may verify that there are no errors using the CRC. The channel decoder status may contain an indication of whether decoding was successful or not. In another example, the channel decoder status may contain an indication of decoder operation on the channel decoder input. For instance, channel decoder 220 may produce a decoder metric, such as a likelihood ratio or a probability that can qualify an indication of a successful decoding. Another type of decoder metric may be produced from a window error detection. Channel decoder 220 may compare the decoder metric to a predetermined decoding threshold. For example, if a decoder metric is produced from window error detection, when the metric is below the predetermined threshold, the channel decoder status may indicate that the data packet decoding is unsuccessful. The predetermined decoding threshold may be determined empirically, such as by simulation. The predetermined decoding threshold may be a function of the encoding scheme, the code (e.g., turbo, convolutional), the decoder, and the number of transmissions. For example, one threshold may be used for the first received packet while a bigger threshold may be used for subsequent data packets. The channel decoder status may indicate whether channel decoder 220 failed to operate properly.

HARQ buffer control unit 230 may manage the transfer of data packets between combine and store unit 210 and HARQ buffer pool 240. If the decoding of a data packet has been unsuccessful, the data packet may be temporarily stored in HARQ buffer pool 240. Additional data packets that are unsuccessfully decoded may also be stored in HARQ buffer pool 240. HARQ buffer control unit 230 may select and transfer data packets stored in HARQ buffer pool 240 to combine and store unit 210 for decoding using a hybrid ARQ method, where previously sent data packets are combined with a newly sent data packet to obtain an accurate, reliable data packet. HARQ buffer control unit 230 may receive control signals for the transferring of data packets. A receive (Rx) control signal may indicate, for example, that a data packet is a HARQ data packet, and it may be transferred to HARQ buffer pool 240 when appropriate. A receive control signal may indicate, for example, that a data packet is a retransmitted data packet, and a previously stored data packet may be transferred from HARQ buffer pool 240 to combine and store unit 210. A receive control signal may indicate a quality of the received data. A receive control signal may indicate a method for combining in combine and store unit 210. The combining method may be, for example, a Chase combining method, or an additional incremental redundancy combining method.

HARQ buffer pool 240 may be any type of memory (e.g., semiconductor, ferric/ferrous) capable of receiving, storing and sending digital contents of one or more data packets. HARQ buffer pool 240 may contain at least one hybrid automatic repeat request memory buffer. In one example, HARQ buffer pool 240 may be a circular buffer. HARQ buffer pool 240 may consist of a number of equal-sized buffers corresponding to the largest size transmission, for example, corresponding to the highest order of modulation, or it may be a contiguous memory space that may be subdivided and allocated as needed. The contiguous memory space may be more memory efficient, especially for a system that employs several modulation schemes, since low order modulations, for example, quaternary phase shift keying (QPSK), and high order modulation, for example, quadrature amplitude modulation (64-QAM), may have different buffer size requirements. If HARQ memory in HARQ buffer pool 240 is available and the receive control signal and HARQ buffer control unit 230 indicate that a data packet requires memory, a portion of HARQ buffer pool 240 may be assigned to the data packet. HARQ buffer control unit 230 may manage the assignment of memory to the data packet, such as setting the size of memory for assignment/allocation, partitioning the pool of memory, and assigning control parameters to the memory (including, for example, a received packet number, channel quality attributes, and a parameter related to time).

Reserved non-HARQ buffer 250 may be any type of memory capable of receiving, storing and sending digital contents of a data packet. Reserved non-HARQ buffer 250 may be of a predefined size. HARQ buffer control unit 230 may allocate reserved non-HARQ buffer 250 dynamically from HARQ buffer pool 240. If HARQ memory is desired but there is no HARQ memory available, the reserved non-HARQ buffer 250 may be used to hold (store) the incoming data packet for combine and store unit 210. Without HARQ buffer pool 240, a retransmission must be self-decodable for successful decoding. Reserved non-HARQ buffer 250 may be used to temporarily store the results of combine and store unit 210, such as the channel decoder input.

HARQ buffer control unit 230 may determine that HARQ buffer pool 240 is full, or nearly full. In instances where HARQ buffer pool 240 is full or nearly full, HARQ buffer control unit 230 may generate a HARQ buffer pool status indicator. The HARQ buffer pool status indicator may be sent to HARQ feedback generator 260. The HARQ buffer pool status indicator may be used to determine that a retransmission of the data packet should be self-decodable. The term HARQ data packet may refer to a data packet that has been retransmitted. A HARQ data packet may be self-decodable or non-self-decodable. A retransmission may be a replica of a previous transmission, may contain portions of a previous transmission, or may contain no portions of a previous transmission.

HARQ buffer control unit 230 may determine that a data packet is a self-decodable data packet, and transfer the data packet from combine and store unit 210 to reserved non-HARQ buffer 250. HARQ buffer control unit 230 may transfer one or more stored data packets from reserved non-HARQ buffer 250 to combine and store unit 210 for subsequent decoding by channel decoder 220.

HARQ buffer control unit 230 may allocate memory from HARQ buffer pool 240 to reserved non-HARQ buffer 250 by partitioning HARQ buffer pool 240 using, for example, statistical methods. Reserved non-HARQ buffer 250 may comprise a portion of the HARQ buffer pool 240. Reserved non-HARQ buffer 250 may comprise, for example, ten percent of the pool of memory. The size of reserved non-HARQ buffer 250 may be determined in part by the size of HARQ buffer pool 240. A large HARQ buffer pool 240 may require little or even no reserved non-HARQ buffer space. In addition, HARQ buffer control unit 230 may allocate a portion of HARQ buffer pool 240 to reserved non-HARQ buffer 250 for storing self-decodable data packets to be received. Received data packets may be decoded successfully without requiring retransmission of any data packets in instances where a transmission channel is clear, data transfer rates are not excessive, or data integrity is not of highest priority. In instances of noisy transmission channels, high data transfer rates, or high reliability requirements for a data transmission, the need to retransmit a data packet may occur. In another embodiment, the first transmission may be assigned to the HARQ buffer pool 240 if memory in the pool is available. The memory may be freed if decoding is successful.

A request for retransmission of a data packet may be made and the initially received data packet may be stored in HARQ buffer pool 240 by combine and store unit 210. A packet decode indicator may be assigned to the data packet. When a HARQ data packet is received, a transfer of the previously one or more received data packets may be made and combined with the newly received data packet. In instances where a large amount (number) of HARQ data packets are being received, and there is insufficient HARQ memory to accommodate the large number of HARQ data packets, HARQ buffer control unit 230 may generate a HARQ buffer pool status indicator to HARQ feedback generator 260. Non-HARQ data packets may be stored in reserved non-HARQ buffer 250. A packet decode indicator may be assigned to the data packet, and the decoding of the data packet may be based on the packet decode indicator. HARQ buffer control unit 230 may dynamically allocate memory to reserved non-HARQ buffer 250. Effective use of reserved non-HARQ buffer 250 may dramatically reduce the memory required for HARQ buffer pool 240, and therefore may reduce the overall memory required for HARQ buffer pool 240 and reserved non-HARQ buffer 250. In portable systems, for example, reduction of memory requirements may reduce size, cost and power consumption significantly.

Allocation of non-HARQ memory may be based on a statistical view of the ARQ process. The system may have to support a number of different data packets that have been sent but not yet positively or negatively acknowledged. The number of different data packets may be, for example, 1024. Of these data packets, a fraction of them are likely to be received correctly and therefore not require HARQ memory, and a fraction of them are likely to be erroneous and therefore require HARQ memory. In general, while HARQ memory must be available for all different data packets, statistically much less memory may be required. On a channel with a 10% probability of first data packet error (operating point), on average approximately 10% of data packets will require HARQ memory at any given moment. HARQ memory may therefore be provided to accommodate a large portion of the different data packets in the system. For example, HARQ storage to hold 150 data packets would be sufficient over 95% of the time with a 10% operating point and 1024 different data packets. As the allocated HARQ memory is filled, a determination may be made indicating that the HARQ memory is full or nearly full. HARQ buffer control unit 230 may request, in coordination with HARQ feedback generator 260, that a self-decode request be sent back to the transmitter to generate self-decodable blocks of data. For example, if an erroneous data packet cannot be stored in HARQ memory, a self-decode request may be sent back such that the next transmission may be decoded without combining data packets from HARQ buffer pool 240. Reserved non-HARQ buffer 250 may be used for the next self-decodable transmission of the data packet, without requiring the use of HARQ buffer pool 240. HARQ memory management may rearrange HARQ buffers in use such that there may be a large contiguous space available for new packets. If HARQ memory becomes available during a sequence of retransmissions, HARQ may be used from that point on.

HARQ feedback generator 260 may be an electronic circuit capable of generating signals to be sent from the receiver to the transmitter. HARQ feedback generator 260 may operate on received packet-by-packet basis. In another embodiment, HARQ feedback generator 260 may group signals from multiple received data packets together before sending the grouped signals to the transmitter. HARQ feedback generator 260 may generate signals to the transmitter upon successful decoding of a data packet. One example of a HARQ feedback signal is an acknowledgement (ACK). HARQ feedback generator 260 may generate signals to the transmitter upon unsuccessful decoding of a data packet. One example of a signal is a negative acknowledgement (NACK). Another example is a self-decode request, which may indicate whether a retransmission of a data packet should be self-decodable or non-self-decodable.

The self-decode request may indicate that a self-decodable packet associated with the data packet be generated at the transmitter. Similarly, the self-decode request may indicate that a non-self-decodable packet associated with the data packet be generated at the transmitter. The self-decode request may contain a field indicating whether a self-decodable data packet should be generated. The self-decode request field may be as small as a single bit. For example, a logical one may indicate a request for a self-decodable data packet, and a logical zero may indicate a request for a non-self-decodable data packet. HARQ feedback generator 260 may generate a self-decode request instruction, or coordinate with circuitry and software to provide the self-decode request instruction to the transmitter when a self-decode request is desired. A self-decode request signal may be contained in a self-decode request instruction. The self-decode request feedback instruction or self-decode request may be generated when a self-decodable data packet is desired.

HARQ feedback generator 260 may generate the self-decode request in response to a determination of whether the receiver could process the received data packet. For example, when the channel quality attribute associated with the received data packet indicates a poor quality data packet, HARQ feedback generator 260 may send a request for a self-decodable packet. Furthermore, HARQ buffer control unit 230 may indicate from stored data packets and the received data packet that the transmission channel may have poor channel quality attributes, and that a self-decodable data packet is necessary for successful decoding. In another example, if the next transmission of a data packet will be non-self decodable and the channel quality attributes indicate that the channel may not be able to support the effective encoded data rate and modulation after the next transmission, HARQ feedback generator 260 may send a request for a self-decodable packet. Conversely, if the next transmission of a packet will be self-decodable and the channel quality attributes indicates that only a slightly stronger code is needed, HARQ feedback generator 260 may send a request for a non-self-decodable packet. The determination of the type of self-decode request may be based on statistical methods employed in HARQ buffer control unit 230. HARQ buffer control unit 230 may employ a mapping between the encoding scheme of the stored packets and the channel quality attributes. One example is a frame error rate mapping between the probability of an unsuccessful data packet and a signal-to-noise ratio. HARQ buffer control unit 230 may map the ensemble of encoding scheme attributes to the frame error rate, along with the current channel quality attribute to determine whether a self-decodable data packet should be sent.

HARQ feedback generator 260 may request a self-decodable retransmission in response to an unsuccessful decoding of a data packet. The indication of the unsuccessful decoding may be contained in a channel decoder status. In one embodiment, HARQ feedback generator 260 may generate a self-decode request based on a memory availability determination made by HARQ buffer control unit 230 or by a channel decoder status. For example, HARQ feedback generator 260 may have possible rules upon an unsuccessful decode, such as: 1) little memory availability—request a self-decodable packet; 2) high memory availability, decoder metric exceeds a predetermined decoding threshold—request a non-self-decodable packet; or 3) decoder metric is below a predetermined decoding threshold—request a self-decodable packet.

HARQ feedback generator 260 may generate a feedback signal in response to the availability of HARQ memory. HARQ feedback generator 260 may generate a free buffer indicator for HARQ buffer control unit 230, in instances where decoding of packets is proceeding well, to assist in the dynamic allocation of HARQ and non-HARQ memory.

HARQ feedback generator 260 may send a signal to HARQ buffer control unit 230 indicating if a data packet that was assigned to a HARQ buffer was decoded correctly, so that the buffer may be freed and reassigned to another packet on a data packet by data packet basis without any type of external messaging required. In instances where HARQ feedback generator 260 receives a HARQ buffer pool status indicator signal from HARQ buffer control unit 230 and the data packet was unsuccessfully decoded, HARQ feedback generator 260 may generate a self-decode request to be sent back to the transmitter. This request may be necessary if the next HARQ retransmission that the transmitter would normally send is not self-decodable. Without the self-decode request, the next retransmission of the data packet may have little chance of successful decoding.

Self-decode requests may be made if the contents of the buffers or the received transmissions are of very poor quality. In instances where the first transmission is completely lost or garbled, a self-decode request may be generated by HARQ feedback generator 260 to receive a self-decodable block. In systems where all transmissions are self-decodable, generation of a self-decode request may occur although it may not be necessary. With NACK or ACK/NACK feedback, feedback for multiple data packets may be grouped and transmitted together if required in the underlying ARQ algorithm.

Reduced memory HARQ system 200 may be implemented with any underlying form or ARQ, such as a selective repeat ARQ or a multi-channel stop-and-wait algorithm. Reduced memory HARQ system 200 may be implemented with any form of ARQ feedback, such as ACK, NACK or ACK/NACK. Reduced memory HARQ system 200 may be implemented with any underlying form of HARQ, for example, turbo, convolutional, or Reed-Solomon codes. Reduced memory HARQ system 200 may be implemented with systems that always have self-decodable blocks or systems that have some blocks that are not self-decodable. Reduced memory HARQ system 200 may have a receiver option to decode independently any self-decodable block before joint decoding. Reduced memory HARQ system 200 may have fixed-sized HARQ buffers, or variable-sized HARQ buffers taken from a managed buffer space.

Sophisticated memory management for HARQ may result in significant data throughput gains with limited available memory. HARQ memory may be allocated according to the HARQ buffer status. If HARQ buffers are nearly empty, more bits per word may be allowed. As more HARQ buffers are allocated, fewer bits per word may be allowed. HARQ memory may be allocated according to channel quality attribute, such as signal quality. If the signal quality is strong, for example, more bits per word may be stored to improve decoding with future retransmissions. If the signal quality is weak, for example, fewer bits per word may be stored to accommodate further retransmissions. Different streams of data to the same receiver may be biased or prioritized for access to HARQ memory. For example, real-time services that cannot meet delay requirements with a retransmission may use reserved non-HARQ buffer 250, while real-time services that allow a single retransmission and need the HARQ gain to meet the quality-of-service requirements may be guaranteed access. Access may be guaranteed by reserving buffers in HARQ buffer pool 240 for the service, or by overwriting the contents of the buffers in use by a non-guaranteed service. Different subscriber devices may have different amounts of memory yet may use the same receive data algorithms. Subscriber devices may evolve over time, encompassing additional memory yet still benefit from the reduced memory HARQ design. Statistical methods may be used for managing HARQ memory.

Reduced memory HARQ system 200, operating in tandem with reduced memory HARQ system 300, may achieve significant gains in data transmission throughput.

Figure 3:
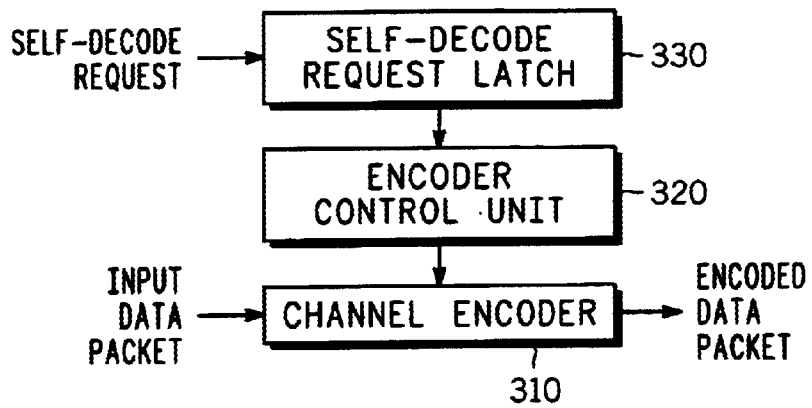
FIG. 3 is a block diagram of another embodiment of a system for reduced memory hybrid ARQ, in accordance with the current invention.

FIG. 3 shows a block diagram of another embodiment of a system for reduced memory hybrid ARQ, in accordance with the present invention at 300.

Reduced memory HARQ system 300 may be comprised of a channel encoder 310, an encoder control unit 320, and a self-decode request feedback latch or self-decode request latch 330. Reduced memory HARQ system 300 may be located near the transmitter of a communication device.

Channel encoder 310 may be an electronic circuit capable of encoding an input data packet prior to transmitting the encoded data packet over a link. Channel encoder 310 may encode the input data packet as a self-decodable packet or as a non-self-decodable packet. Channel encoder 310 may encode the input packet using, for example, turbo-codes, low density parity check (LDPC) codes, Reed-Solomon (RS) codes, Bose, Chaudhuri and Hocquenghem (BCH) codes, cyclic codes, or convolutional codes. There may be many self-decodable codes for a data packet. Similarly, there may be many different non-self-decodable codes for a data packet. Encoder control unit 320 may select the encoding scheme, such as one of the self-decodable codes or one of the non-self-decodable codes that channel encoder 310 uses for encoding the input data packet.

Channel encoder 310 may selectively repeat and/or puncture (remove) portions of an encoded data packet prior to transmission. For example, there may be more than one repeat and/or puncture pattern associated with a code. In one example, there may be one pattern for a self-decodable code while a different pattern is used for a non-self-decodable code. In another example, applying a pattern to an encoded packet that is self-decodable may still produce a packet that is self-decodable. There may be multiple patterns for a self-decodable code. There may also be multiple patterns for a non-self-decodable code. In another example, a non-self-decodable code may be produced from a self-decodable code. The encoded packet may be forwarded for transmission over the link. The term "encoded packet" may refer to both self-decodable and non-self-decodable packets. Channel encoder 310 may encode the data packet as a self-decodable data packet based on a control signal from encoder control unit 320. Channel encoder 310 may encode the data packet as a non-self-decodable packet based on a control signal from encoder control unit 320.

Encoder control unit 320 may be an electronic circuit for generating signals to control the operation and function of channel encoder 310. Encoder control unit 320 may generate a control signal for channel encoder 310 based on a signal from a self-decode request latch 330. Encoder control unit 320 may select the encoding scheme that channel encoder 310 uses for an input data packet based on an encoding scheme selection input produced by self-decode request latch 330. The encoding scheme selection input may indicate how the input data packet should be encoded. In one example, the encoding scheme selection input may indicate that the input data packet should be encoded as a self-decodable data packet. In another example, the encoding scheme selection input may indicate that the input data packet should be encoded as a non-self-decodable data packet.

Encoder control unit 320 may be responsive to a number of transmissions of the data packet. Encoder control unit 320 may select an encoding scheme based on the number of transmissions. For example, the first transmission may indicate that encoder control unit 320 should select a self-decodable encoding scheme. Encoder control unit 320 may select an encoding scheme for the channel encoder based on evaluating the number of transmissions made and the encoding scheme selection input that was determined by receiving a self-decode request.

Encoder control unit 320 may also be responsive to messages associated with a transmitted data packet. For example, in a HARQ system that uses NACK messages for indicating an unsuccessful data packet transmission, the absence of receiving a NACK associated with a transmitted data packet within a predetermined period of time may determine which encoding scheme to use. In this example, the determination may indicate to encoder control unit 320 that the encoding scheme for the input data packet should produce a self-decodable data packet. In another example, in a HARQ system that uses ACK and NACK messages, the absence of either the ACK or NACK message within a predetermined period of time, such as one second or a period of time as specified in pertinent standards/protocol, may also determine which encoding scheme to use. The determination may indicate to encoder control unit 320 that the encoding scheme for the input data packet should produce a self-decodable data packet.

Self-decode request latch 330 may be an electronic circuit to produce an encoding scheme selection input based on receiving a self-decode request associated with a data packet. Self-decode request latch 330 may determine that the self-decode request indicates a request for a self-decodable data packet. Self-decode request latch 330 may also determine that the self-decode request indicates a request for a non-self-decodable data packet. In one embodiment, the self-decode request may have a self-decodable-request field. The self-decodable-request field may be as simple as one bit that may be interpreted, for example, as a request for self-decodable data packet when the bit is logical one or as a request for non-self-decodable data packet when the bit is logical zero.

Reduced memory HARQ system 300 may coordinate in tandem with reduced memory HARQ system 200 to effectively and reliably transmit a data packet using a self-decode request mechanism.

One of the benefits of the reduced memory HARQ system 300 is that less memory may be required in the receiver. With the self-decode request, the receiver may control the size of the retransmissions based on how much (instantaneous) memory is available in the receiver. For example, when there is little memory available, the receiver may request self-decodable data packets for reasons such as decreasing the effective code rate of the retransmission combined with the stored data packet, thereby increasing the probability of successful decoding and increasing the chance of being able to free HARQ memory upon successful decoding. Such a mechanism can statistically decrease the probability that new data packets that are not decoded correctly on a first transmission attempt are denied buffers from the HARQ memory pool. With the self-decode request, the receiver may control the size of the retransmissions based on a channel decoder status. For example, the channel decoder status may be a decoder metric, such as CRC status, likelihood ratios, or data packet reliability. In this example, channel decoder status may indicate that a non-self-decodable data packet is sufficient for successful decoding. For a general incremental redundancy HARQ method, a non-self-decodable data packet may require less memory in the receiver. Thus, for certain instantaneous channel conditions, requesting a non-self-decodable data packet may reduce the amount of memory required in the receiver.

Figure 4A:
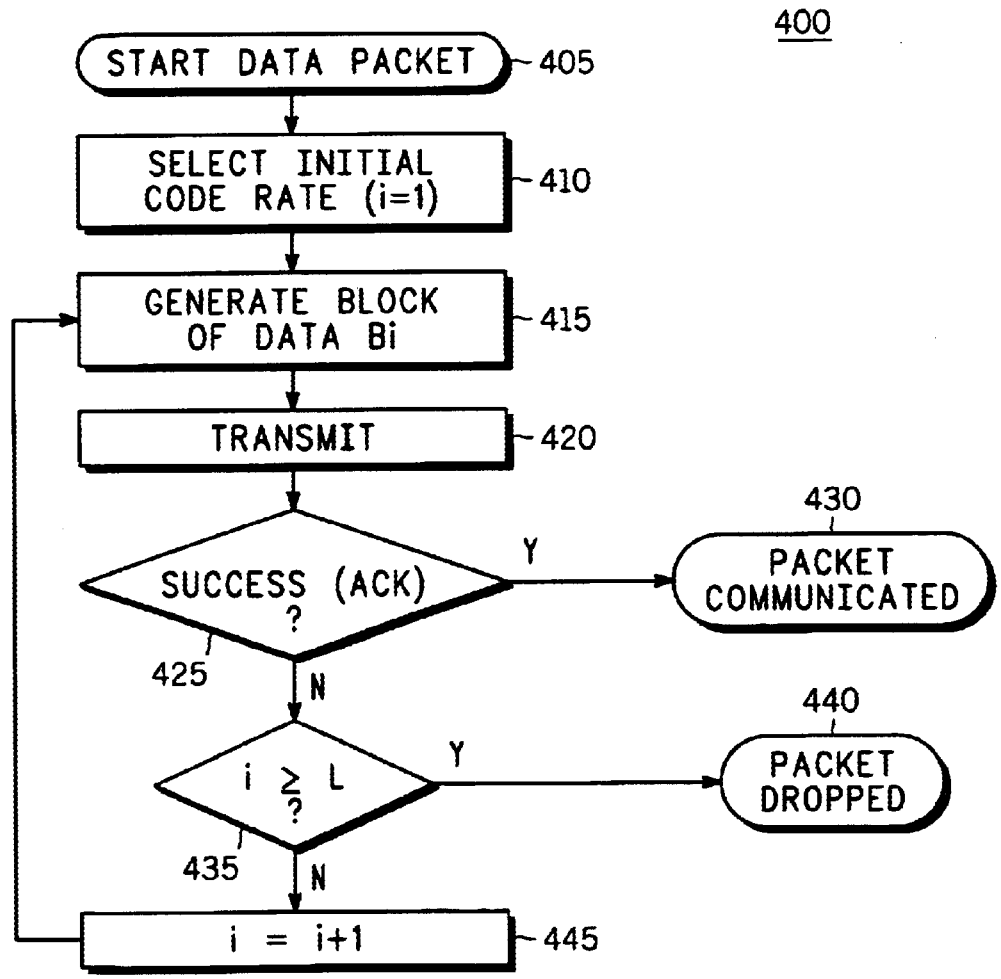
FIG. 4a and FIG. 4b are flow diagrams of a conventional hybrid ARQ transmitter and receiver.

FIG. 4a is a flow diagram of a conventional hybrid ARQ transmitter at 400. As seen at block 405, a data packet may be readied for transmission. The data packet may be originated at mobile switching center 130, or at wireless communication device 110, 112, 114. As seen at block 410, an initial code rate may be selected. The code rate selected may be high, or may be low based on actual or anticipated conditions of the transmission channel. The code rate may be implicitly determined from other factors, such as, for example, the modulation, and frame size. An index number i may be set to a value, such as one, as seen at block 410. An initial block of data or data packet ($B_i$) may be generated and encoded corresponding to the first data packet as seen at block 415, and transmitted to the receiver as seen at block 420. As seen at block 425, if the data packet is successfully received and decoded by the receiver, the packet is communicated as seen at block 430 and another data packet may be prepared for transmission. If a block of data is successfully received and decoded by the receiver, an acknowledge (ACK) signal may be sent from the receiver to the transmitter. If the receiver decodes a block of data unsuccessfully, a negative acknowledgement (NACK) may be sent by the receiver back to the transmitter. An additional attempt may be made to retransmit the data packet if the number of attempts to send the data packet is less than a predetermined number L, as seen at block 435. The predetermined number may be related to, for example, channel quality, data transfer rate, or data integrity. If the number of attempts to send the data packet is equal to or greater than the predetermined number L, the packet may not be retransmitted and the data packet may be dropped (unsuccessful transmission) as seen at block 440. If the number of attempts to send the data packet is less than the predetermined number, an index number associated with the data packet may be incremented as seen at block 445, and a new attempt may be initiated as seen at block 415.

Figure 4B:
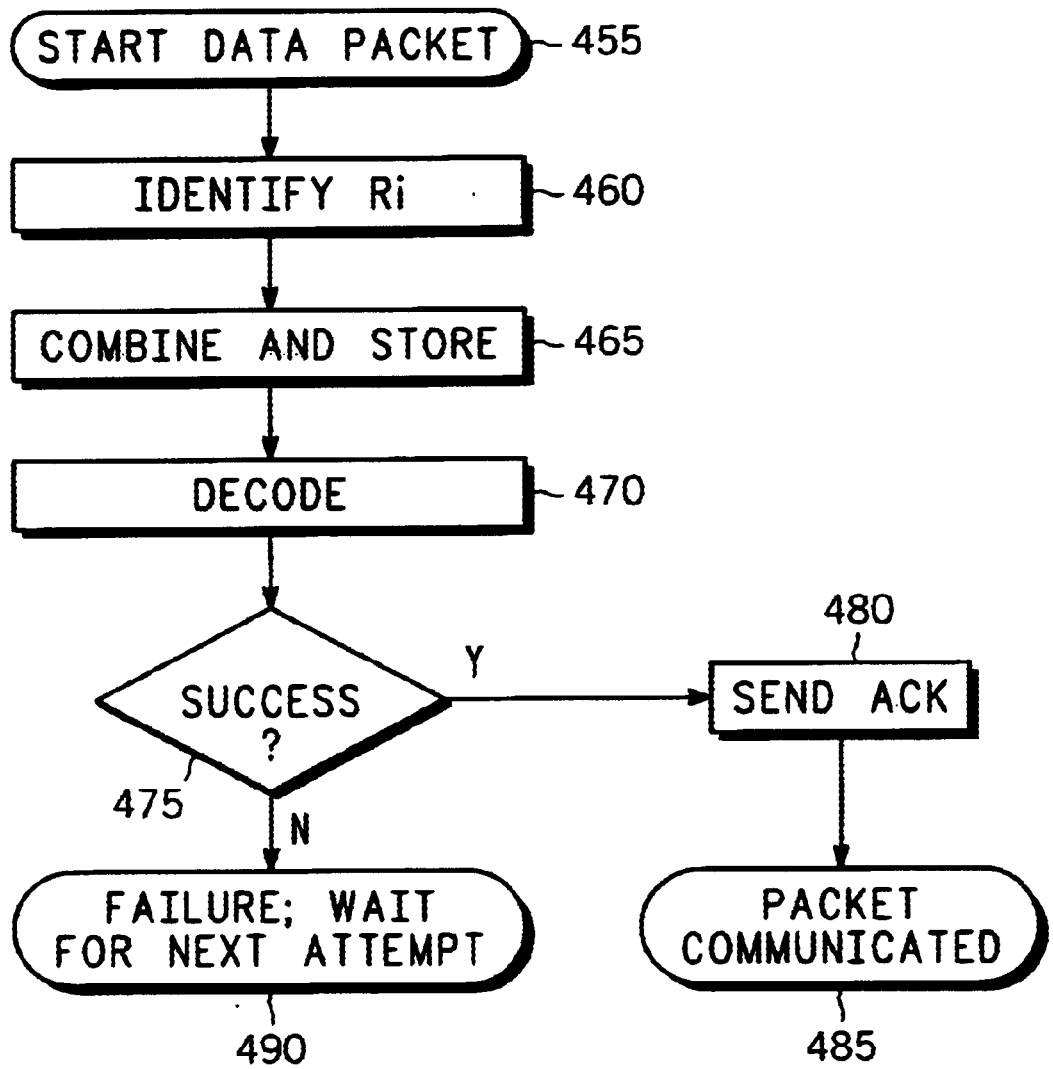

FIG. 4b is a flow diagram of a conventional hybrid ARQ receiver at 450. As seen at block 455, a data packet may be received. A block of data or a data packet ($R_i$) may be received as seen at block 460. A HARQ data packet may be identified by an associated index number greater than one. The data packet may be transferred to a combine and store unit as shown at block 465, and decoded as seen at block 470. As seen at block 475, if the decoding is successful, the receiver may send an acknowledgment (ACK) signal back to the transmitter as seen at block 480 and the data packet may be transmitted successfully as seen at block 485. Alternatively, the receiver may send a NACK signal back to the transmitter if the data packet was decoded unsuccessfully, and may wait for the HARQ data packet to arrive before attempting to decode the packet again as seen at block 490. If the data packet has been decoded unsuccessfully, the newly sent HARQ data packet may be combined with previously sent data packets and decoding may be reattempted.

Figure 5:
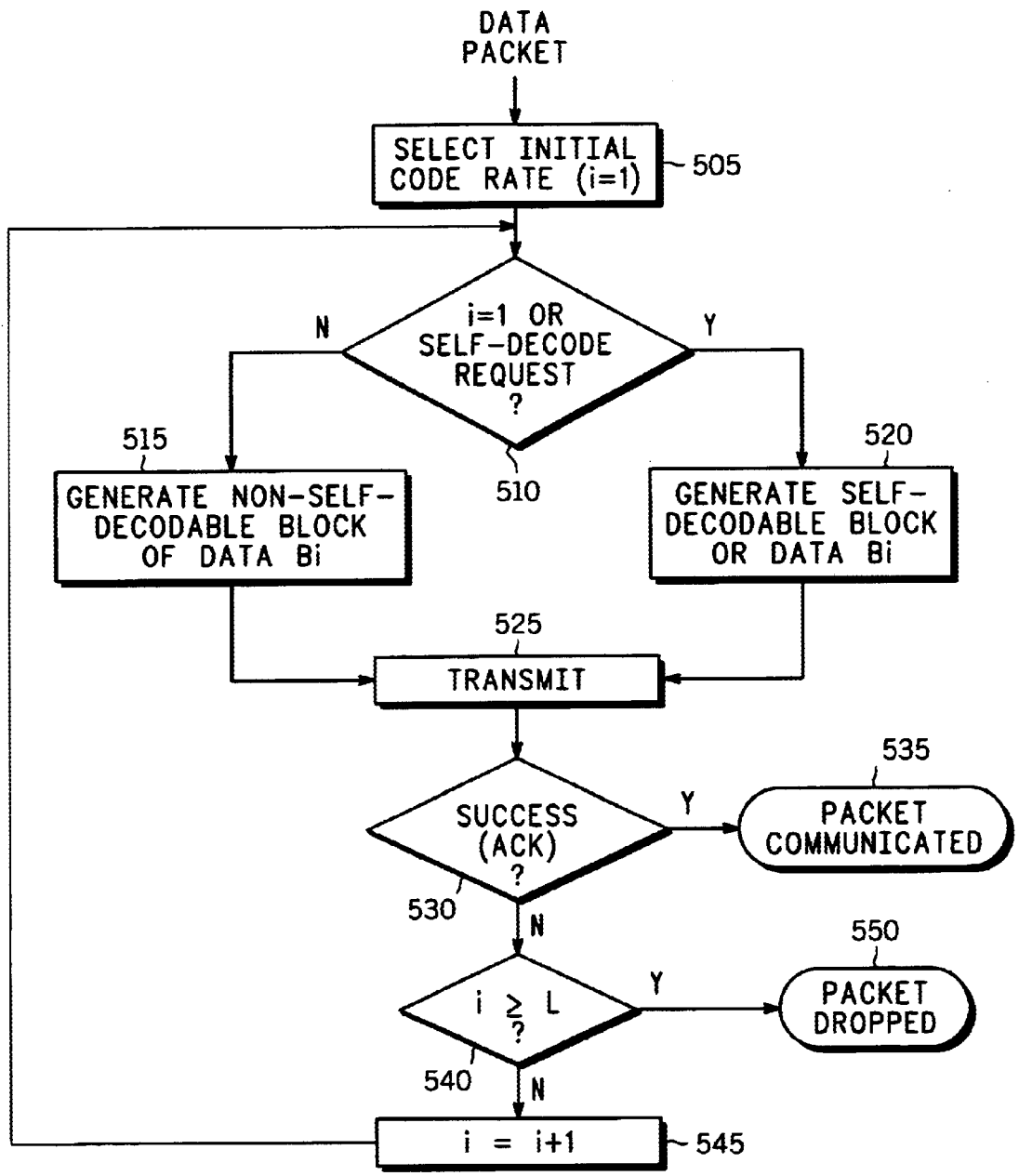
FIG. 5 is a flow diagram of one embodiment of a method for reduced memory hybrid ARQ, in accordance with the current invention.

FIG. 5 shows a flow diagram of one embodiment of a method for reduced memory hybrid ARQ in accordance with the present invention at 500.

Reduced memory HARQ method 500 comprises steps to encode an input data packet based on a control signal that is related to a self-decode request. The control signal may indicate to encode the data packet as a self-decodable data packet or as a non-self-decodable data packet. The control signal may select an encoding scheme for the data packet. The control signal may be based on an index number. The transmission index number may indicate the number of transmissions associated with the data packet. The value of one for the transmission index number may indicate the first transmission. The first transmission may be self-decodable. The control signal may be based on receiving a self-decode request associated with the data packet. The self-decode request may indicate that the receiver requests a self-decodable data packet or a non-self-decodable data packet. The control signal may be based on determining whether a NACK or and ACK has been received within a predetermined period of time.

An input data packet may be readied for transmission by selecting an initial code rate for the transmission as seen at block 505. An index number i may also be set to a value, such as one, as seen at block 505. The initial code rate may be related to the encoding scheme.

As seen at block 510, the input data packet may be encoded depending on the control signal indicating a self-decode data packet. If the condition in block 510 is satisfied, the input data packet may be encoded as a self-decodable block of data ($B_i$) as seen at block 520. If the conditions in block 510 are not satisfied, the input data packet may be encoded as a non-self-decodable block of data ($B_i$) as seen at block 515.

The encoded data packet may be transmitted as seen at block 525. As seen at block 530, if the encoded data packet is received and decoded successfully by the receiver, then an acknowledgment (ACK) may be sent back to the transmitter, and the data packet may be deemed successfully communicated as seen at block 535. The decoding of the encoded data packet may involve combining at least two received packets in the receiver when the index number i indicates at least two transmissions of the data packet have occurred. It may be possible that a data packet combined with at least one received packet in the receiver allows successful decoding but the data packet alone does not allow for successful decoding. There may be other ways for a receiver to provide an indication of a successful decoding of the data packet.

If the data packet is received unsuccessfully, an acknowledgment signal may not be sent to the transmitted, or a negative acknowledgement (NACK) indication sent to the transmitter. An absence of an NACK or an ACK may indicate unsuccessful transmission. As seen at block 540, if the transmission of the data packet was not successful, the index number i may be compared to a transmission limit L, where L may include the number of transmissions and retransmissions permitted for the data packet. The value of L may depend on factors such as, for example, data packet type (e.g., real-time versus non-real-time, voice, FTP), and delay requirements. An index number indicating the number of transmission attempts may be incremented as seen at block 545. If the number of transmission attempts is less than a predefined number L, then the data packet may be retransmitted as seen at block 510 by simply repeating the data transmission attempt, by encoding the data packet as a self-decodable data packet, by encoding the data packet as a non-self-decodable data packet, or by another suitable approach. If the number of transmission attempts is equal to or greater than the maximum number of attempts allowed, then the data packet may be dropped as seen at block 550 and attempts to transmit the data packet may be discontinued.

Figure 6:
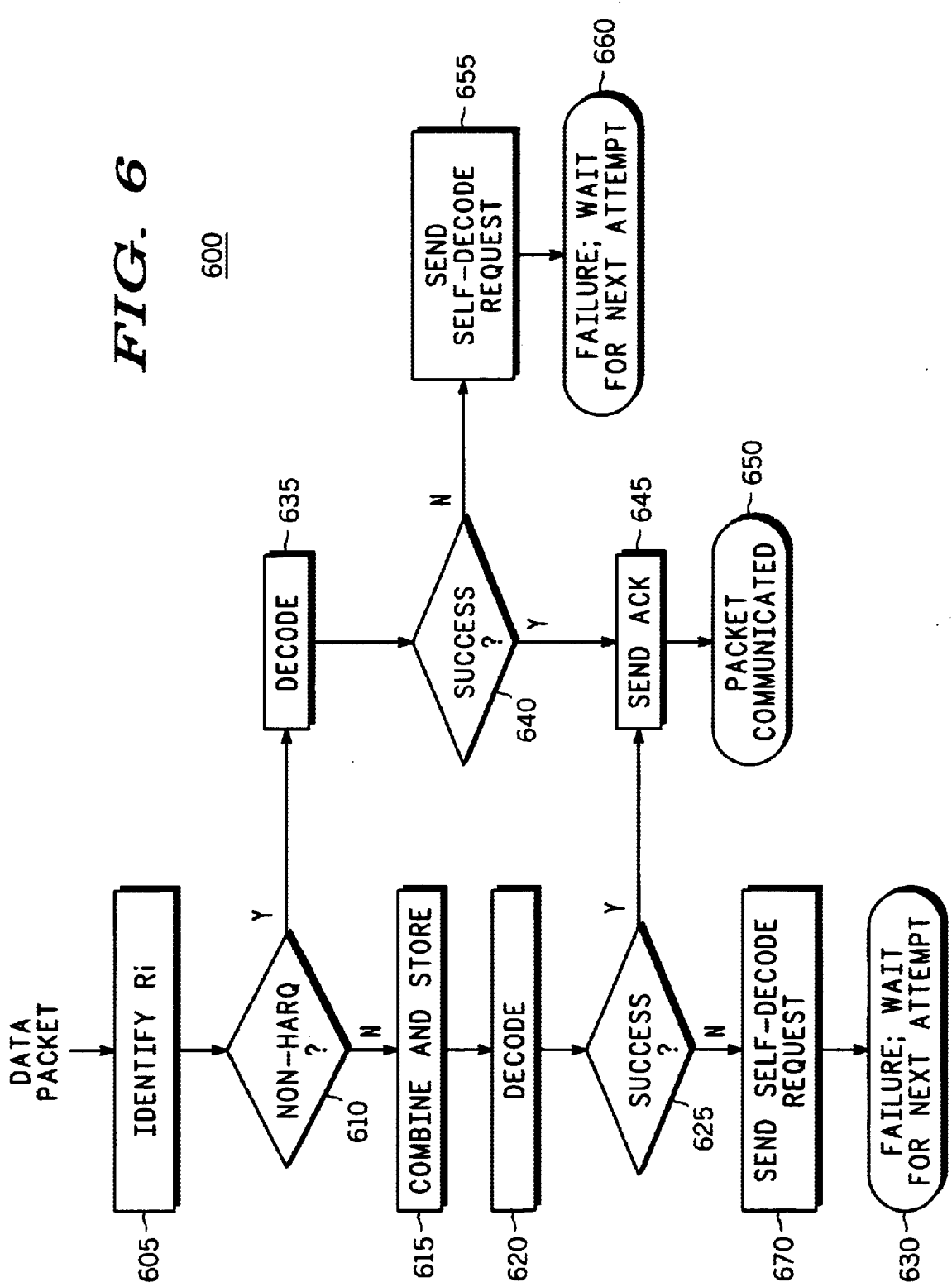
FIG. 6 is a flow diagram of another embodiment of a method for reduced memory hybrid ARQ, in accordance with the current invention.

FIG. 6 shows a flow diagram of another embodiment of a method for reduced memory hybrid ARQ in accordance with the present invention at 600.

Reduced memory HARQ method 600 may comprise steps to decode a data packet, and may generate a self-decode request if the data packet is received or decoded unsuccessfully. A block of data or a data packet ($R_i$) may be received as seen at block 605, and a determination made whether the data packet is a non-HARQ data packet as seen at block 610.

In one context, the term non-HARQ data packet may be related to the number of received data packets associated with this data packet. For example, the first received data packet may be called a non-HARQ packet. In another example, the ith received data packet, i>1, may be called a non-HARQ packet when the receiver was unable to store previously received data packets due to, for example, insufficient memory in the receiver, receiver implementation of ARQ, or poor quality of the received data packet. Further, the ith received data packet, i>1, may be called a non-HARQ packet when the receiver discards some or all previously received data packets due to protocol, such as time-out. In contrast, the ith received data packet, i>1, may be called a HARQ packet when the receiver has stored (in some form) some or all previously received data packets. The decision of whether a received data packet is a HARQ packet may be determined by the memory management unit, such as HARQ buffer control unit 230 in FIG. 2.

If the data packet is determined to be a HARQ data packet, the data packet may be combined with previous data packets as seen at block 615 to produce a channel decoder input. The received data packet may be stored as seen at block 615, and decoded as seen at block 620. The received data packet may be stored in a reserved buffer or a hybrid automatic repeat request memory buffer in block 615. The operations in block 615 may correspond to the operations of combine and store unit 210 in FIG. 2. As seen at block 625, if the channel decoder input is decoded successfully, an acknowledgment (ACK) may be sent back to the transmitter as seen at block 645 and the data packet may be deemed transmitted successfully as seen at block 650. The receiver may provide some other method of indicating a successful transmission in block 645.

If the data packet is determined to be decoded unsuccessfully as seen at block 625, the receiver may send a self-decode request as seen at block 670. The self-decode request may contain a field that indicates the type of encoding scheme to use for a retransmission of the data packet, such as using a self-decodable or a non-self-decodable encoding scheme. The bit value with a logical zero may indicate a self-decodable encoding scheme request while a logical one may indicate a non-self-decodable encoding scheme request. The field may be related, for example, to the quality of the data packet before decoding, to some decoder metric (e.g., bit error rate), to the amount of memory available in the receiver at the time of receiving the data packet, the number of transmissions/retransmissions of this data packet, or services associated with the data packet. The self-decode request may be part of a NACK message. In one embodiment of the invention, the received data packet may be stored for combining with subsequent retransmissions associated with the data packet. The stored data packet may be modified to satisfy memory (buffer) requirements, such as by truncating bits. In another embodiment, the output (or possibly modified version) of the combine and store operation at block 615 may be stored for combining in subsequent receptions of the data packet. In yet another embodiment, the received data packet (or a modified version of the data packet) or the output (or possibly modified version) of the combine and store operation at block 615 may not be stored due to, for example, memory limitations in the receiver or protocol. As seen in block 630, a data packet transfer failure may have occurred and the decoder may wait for the next data packet transmission attempt. A NACK indicator may be sent back to the transmitter. In another embodiment, the NACK and self-decode request may be combined into one message.

As seen at block 610, if the data packet is determined to be a non-HARQ data packet, the data packet may be decoded as a self-decodable data packet as seen at block 635. Before decoding, the data packet may be stored in a reserved buffer. As seen at block 640, if the data packet is decoded successfully, an acknowledgment (ACK) may be sent back to the transmitter as seen at block 645 and the data packet may be deemed transmitted successfully as seen at block 650. As seen at block 640, if the data packet is decoded unsuccessfully, a self-decode request may be made as seen at block 655. The operations in block 655 may be similar to the operations in block 670. The received data packet may be stored for later combining with the next data packet transmission attempt. The received data packet may be modified before storage, such as changing the precision or converting in log-likelihood ratios. In another example, the received data packet may be discarded due to insufficient memory or poor channel quality attributes. A data packet transfer failure may have occurred and the decoder may wait for the next data packet transmission attempt as seen at block 660.

Reduced memory HARQ method 500 and reduced memory HARQ method 600 may be used in coordination with each other to reliably transmit and receive a data packet based on a self-decode request and an ability to generate a self-decodable block of data based on the self-decode request. In instances where the transmitter may not be configured suitably to accommodate a self-decode request instruction, reduced memory HARQ method 600 operating at the receiver may continue to function with the underlying HARQ method, and to continue to provide the benefits of memory management. Similarly, in cases where a receiver is not configured suitably to generate a self-decodable request, reduced memory HARQ method 500 operating at the transmitter may still function, though without some of the advantages and benefits the method affords.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of operating a hybrid automatic repeat request communication system in a receiver comprising:
   determining whether the receiver can process a data packet; and
   sending a self-decode request associated with the data packet based on the determination, wherein the self-decode request indicates that either a self-decodable packet, or non-self decodable packet associated with the data packet should be generated.

2. The method of claim 1, wherein the determination is based on an availability of a hybrid automatic repeat request memory buffer.

3. The method of claim 1, wherein the determination is based on a decoder metric generated from decoding the data packet.

4. The method of claim 3, wherein the decoder metric is compared to a predetermined decoding threshold.

5. The method of claim 1, wherein the determination is based on a channel quality attribute.

6. The method of claim 1, wherein the self-decode request comprises a request for a self-decodable data packet.

7. The method of claim 1, wherein the self-decode request comprises a request for a non-self-decodable data packet.

8. The method of claim 1, wherein the self-decode request comprises a self-decode request field of at least one bit.

9. The method of claim 1 further comprising:
   allocating a portion of a hybrid automatic repeat request memory buffer pool to a reserved buffer.

10. The method of claim 9 further comprising:
    storing the data packet in the reserved buffer prior to decoding.

11. A hybrid automatic repeat request communication system comprising:
    means for determining whether a receiver can process a data packet; and
    means for sending a self-decode request associated with the data packet based on the determination, wherein the self-decode request indicates that either a self-decodable pocket, or non-self decodable packet associated with the data packet should be generated.

12. The system of claim 11 further comprising:
    means for allocating a portion of a hybrid automatic repeat request memory buffer pool to a reserved buffer.

13. The system of claim 12 further comprising:
    means for storing the data packet in the reserved buffer prior to decoding.

14. A computer usable medium including a program for operating a hybrid automatic repeat request communication system comprising:
    computer program code for determining whether a receiver can process a data packet; and
    computer program code for sending a self-decode request associated with the data packet based on the determination, wherein the self-decode request indicates that either a self-decodable packet, or non-self decodable packet associated with the data packet should be generated.

15. The computer usable medium of claim 14 further comprising:
    computer program code for allocating a portion of a hybrid automatic repeat request memory buffer pool to a reserved buffer.

16. The computer usable medium of claim 15 further comprising:
    computer program code for storing the data packet in the reserved buffer prior to decoding.

17. A method of operating a hybrid automatic repeat request communication system comprising:
    determining whether a self-decode request has been received at a transmitter, wherein the self-decode request indicates that either a self-decodable packet, or non-self decodable packet should be generated; and
    generating a self-decodable data packet at the transmitter based on the self-decode request determination.

18. The method of claim 17 wherein the self-decode request is received from a hybrid automatic repeat request communication device in response to a memory availability determination.

19. The method of claim 17 wherein the self-decode request is received from a hybrid automatic repeat request communication device in response to a channel decoder status.

20. The method of claim 17 further comprising:
    determining whether a negative-acknowledgement signal has been received at the transmitter in response to a transmitted data packet; and
    generating the self-decodable data packet based on the negative-acknowledgement signal determination.

21. The method of claim 17 further comprising:
    determining whether one of an acknowledgement signal or a negative-acknowledgement signal in response to a transmitted data packet has been received within a predetermined period of time at the transmitter; and
    generating the self-decodable data packet if it is determined that the acknowledgement signal or negative-acknowledgement signal has not been received.

22. A hybrid automatic repeat request communication system comprising:
    means for determining whether a self-decode request has been received at a transmitter, wherein the self-decode request indicates that either a self-decodable packet, or non-self-decodable packet should be generated; and means for generating a self-decodable data packet at the transmitter based on the self-decode request determination.

23. The system of claim 22 further comprising:

means for determining whether a negative-acknowledgement signal has been received at the transmitter in response to a transmitted data packet; and means for generating the self-decodable data packet based on the negative-acknowledgement signal determination.

24. The system of claim 22 further comprising:

means for determining whether one of an acknowledgement signal or a negative-acknowledgement signal in response to a transmitted data packet has been received within a predetermined period of time at the transmitter; and means for generating the self-decodable data packet if it is determined that the acknowledgement signal or negative-acknowledgement signal has not been received.

25. A computer usable medium including a program for operating a hybrid automatic repeat request communication system comprising:

computer program code for determining whether a self-decode request has been received at a transmitter, wherein the self-decode request indicates that either a self-decodable packet, or non-self decodable packet should be generated; and computer program code for generating a self-decodable data packet at the transmitter based on the self-decode request determination.

26. The computer usable medium of claim 25 further comprising:

computer program code for determining whether a negative-acknowledgement signal has been received at the transmitter in response to a transmitted data packet; and computer program code for generating the self-decodable data packet based on the negative-acknowledgement signal determination.

27. The computer usable medium of claim 25 further comprising:

computer program code for determining whether one of an acknowledgement signal or a negative-acknowledgement signal in response to a transmitted data packet has been received within a predetermined period of time at the transmitter; and computer program code for generating the self-decodable data packet if it is determined that the acknowledgement signal or negative-acknowledgement signal has not boon received.

28. A hybrid automatic repeat request communication device in a receiver comprising:

a hybrid automatic repeat request buffer control unit;

a pool of memory operably connected to the hybrid automatic repeat request buffer control unit to manage the pool of memory;

a combine and store unit operably connected to the hybrid automatic repeat request buffer control unit to generate a channel decoder input based on a data packet; and a channel decoder operably connected to the combine and store unit to process the channel decoder input;

wherein the data packet is stored in the pool of memory in response to a hybrid automatic repeat request buffer memory determination.

29. The device of claim 28 wherein the hybrid automatic repeat request buffer control unit partitions the pool of memory into a reserved buffer and at least one hybrid automatic repeat request memory buffer.

30. The device of claim 29 wherein the partitioning of the pool of memory is based on a statistical method to store the data packet.

31. The device of claim 28 further comprising: a self-decode request generator operably connected to the hybrid automatic repeat request buffer control unit and operably connected to the channel decoder;

wherein the self-decode request generator sends a self-decode request in response to the hybrid automatic repeat request buffer memory determination.

32. The device of claim 31 wherein the self-decode request generator sends a self-decode request in response to a channel decoder status.

33. A hybrid automatic repeat request communication device in a transmitter comprising:

a self-decode request latch to provide an encoding scheme selection input in response to a self-decode request, wherein the self-decode request indicates that either a self-decodable packet, or non-self decodable packet should be generated;

an encoder control unit operably connected to the self-decode request latch to select an encoding scheme associated with an input data packet based on the encoding scheme selection input; and a channel encoder operably connected to the encoder control unit to encode the input data packet;

wherein the input data packet is encoded as a self-decodable data packet by the channel encoder in response to the self-decode request.

* * * * *